US012736311B2

(12) United States Patent
Fegg et al.

(10) Patent No.: US 12,736,311 B2
(45) Date of Patent: Sep. 15, 2026

(54) METHOD FOR PROTECTING AN OBJECT FROM A RADAR-GUIDED MISSILE

(71) Applicant: Rheinmetall Waffe Munition GmbH, Südheide (DE)

(72) Inventors: Martin Fegg, Berchtesgaden (DE); Martin Wegscheider, Bayerisch Gmain (DE); Jan Weinbeer, Bad Reichenhall (DE)

(73) Assignee: Rheinmetall Waffe Munition GmbH, Südheide (DE)

( * ) Notice: Subject to any disclaimer, the term of this patent is extended or adjusted under 35 U.S.C. 154(b) by 320 days.

(21) Appl. No.: 18/396,965

(22) Filed: Dec. 27, 2023

(65) Prior Publication Data

US 2024/0125581 A1 Apr. 18, 2024

Related U.S. Application Data

(63) Continuation of application No. PCT/EP2022/066213, filed on Jun. 14, 2022.

(30) Foreign Application Priority Data

Jul. 2, 2021 (DE) .................... 10 2021 117 084.2

(51) Int. Cl.

| | |
|---|---|
| ***F41H 11/02*** | (2006.01) |
| ***B64U 20/80*** | (2023.01) |
| ***F41J 2/00*** | (2006.01) |
| ***G01S 7/02*** | (2006.01) |
| ***G01S 7/38*** | (2006.01) |
| ***G01S 13/75*** | (2006.01) |
| *B64U 101/15* | (2023.01) |
| *B64U 101/17* | (2023.01) |
| *B64U 101/19* | (2023.01) |

(52) U.S. Cl.

CPC ............ *F41H 11/02* (2013.01); *B64U 20/80* (2023.01); *F41J 2/00* (2013.01); *G01S 7/021* (2013.01);

(Continued)

(58) Field of Classification Search

CPC ... F41H 11/02; F41J 2/00; G01S 7/021; G01S 7/38; G01S 13/751

See application file for complete search history.

(56) References Cited

U.S. PATENT DOCUMENTS 4,806,938 A * 2/1989 Meadows ........... H01Q 3/2647 342/370
5,388,783 A * 2/1995 Lynn ..................... F41G 7/224 244/3.14

(Continued)

FOREIGN PATENT DOCUMENTS

DE 10 2011 114 574 A1 4/2013
DE 10 2015 002 737 A1 9/2016

(Continued)

OTHER PUBLICATIONS

International Search Report from corresponding PCT Application No. PCT/EP2022/066213, dated Oct. 11, 2022.

*Primary Examiner* — Marcus E Windrich

(74) *Attorney, Agent, or Firm* — Harness, Dickey & Pierce, P.L.C.

(57) ABSTRACT

The invention relates to a method for protecting an object, in particular a land vehicle or watercraft, in particular a ship, from of a radar-guided missile by deploying and using an active offboard reflector, which is arranged at a decoy and comprises at least one receiving antenna and at least one transmitting antenna, wherein a radar signal transmitted by the radar-guided missile is picked up and is returned to the missile as an amplified signal in the previously ascertained opposite direction of reception; the invention proposes carrying out the method by deploying a plurality of flying drones, each having at least one active offboard reflector, and positioning the drones relative to one another in space in such a way that the active offboard reflectors thereof act as individual scattering centers and the signals therefrom (Continued)

that are returned to the missile collectively produce a radar scatter pattern that simulates the object to be protected.

13 Claims, 6 Drawing Sheets

(52) U.S. Cl.
CPC .............. *G01S 7/38* (2013.01); *G01S 13/751* (2013.01); *B64U 2101/15* (2023.01); *B64U 2101/17* (2023.01); *B64U 2101/19* (2023.01); *B64U 2201/102* (2023.01)

(56) References Cited

U.S. PATENT DOCUMENTS

| | | | | |
|---|---|---|---|---|
| 5,814,754 | A * | 9/1998 | Mangolds | F41J 2/00 342/10 |
| 6,782,826 | B1 * | 8/2004 | O'Dwyer | F42B 5/15 102/341 |
| 10,670,376 | B2 * | 6/2020 | Grundner | F41J 2/00 |
| 2007/0159379 | A1 * | 7/2007 | Bannasch | F41J 2/00 342/67 |
| 2008/0018525 | A1 | 1/2008 | Svy et al. | |
| 2018/0023928 | A1 | 1/2018 | Grundner et al. | |
| 2018/0074520 | A1 * | 3/2018 | Liu | G05D 1/104 |
| 2019/0137603 | A1 | 5/2019 | Peacock | |
| 2019/0204414 | A1 | 7/2019 | Steinmetz | |
| 2019/0252791 | A1 * | 8/2019 | Svy | H01Q 15/148 |
| 2020/0371206 | A1 | 11/2020 | Glass et al. | |
| 2022/0290951 | A1 * | 9/2022 | Moderegger | F41J 2/00 |
| 2022/0299296 | A1 * | 9/2022 | Clelland | B64D 1/02 |

FOREIGN PATENT DOCUMENTS

| | | | |
|---|---|---|---|
| DE | 10 2019 117 801 | A1 | 1/2021 |
| EP | 1 668 310 | A1 | 6/2006 |
| EP | 2 761 245 | B1 | 10/2017 |
| RU | 2 660 518 | C1 | 7/2018 |
| RU | 2 685 282 | C1 | 4/2019 |
| WO | WO-2021/048516 | A1 | 3/2021 |

* cited by examiner

METHOD FOR PROTECTING AN OBJECT FROM A RADAR-GUIDED MISSILE

CROSS-REFERENCE TO RELATED APPLICATIONS

This application is a continuation application of PCT Application No. PCT/EP2022/066213, filed on 14 Jun. 2022, which claims priority to and benefit of German Patent Application No. 10 2021 117 084.2, filed on 2 Jul. 2021. The entire disclosures of the applications identified in this paragraph are incorporated herein by references.

FIELD

The invention relates to a method for protecting an object—in particular, a land vehicle or watercraft, and in particular a ship—from a radar-guided missile, by deploying and using an active offboard reflector which is arranged on a decoy and comprises at least one receiving antenna and at least one transmitting antenna, wherein a radar signal transmitted by the radar-guided missile is picked up and returned to the missile as an amplified signal in the previously ascertained opposite direction of reception.

The invention also relates to a protection system for carrying out the method, comprising a decoy and at least one active offboard reflector, which is arranged on the decoy and has at least one receiving antenna and at least one transmitting antenna, as well as a device for amplifying a radar signal transmitted by the radar-guided missile and received by the receiving antenna, and a device for controlling the transmitting antenna and for transmitting the amplified radar signal in the opposite direction of reception back to the incoming missile, a device for ascertaining the direction of reception of the previously transmitted radar signal that is received by the missile.

BACKGROUND

Such a method and an apparatus are known and described in DE 10 2011 114 574 A1. With this document, it has already been proposed to transmit a radar signal of an incoming radar-guided missile back to the missile in an amplified form, i.e., actively, starting specifically from a decoy, which carries along the active offboard reflector required for this purpose. The object to be protected is typically a ship which, before the start of an attack, carries along a decoy equipped with the active off-board reflector. However, it is at least basically conceivable that the decoy which is associated with the object to be protected already be carried along at some distance from the object to be protected, and in particular on an accompanying vehicle.

Furthermore, US 2020-0371206 A1, US 2019-0137603 A1, and US 2019-0204414 A1 disclose methods and apparatuses for simulating a virtual object, such as in particular an aircraft or a rocket, by means of an active reflector, wherein the simulated virtual object is not located at the location of the active reflector. The simulation provided by a virtual object serves to calibrate a radar system or to test the effectiveness of a radar system. The active reflector is arranged in an aircraft and produces a virtual object at a distance from the aircraft by modulation and returning a signal originating from the radar system.

A passive protection system is known from DE 10 2019 117 801 U1. An aircraft carries a spatial arrangement of several passive corner reflectors, which form a decoy for deceiving radar-guided missiles by the passive reflectors reflecting back a radar signal emanating from the radar-guided missile. By means of the arrangement of several passive Corner reflectors, it can clearly be better achieved that the radar signal be effectively reflected back to the attacking missile.

US 2008-0018525 A1 teaches a method and a highly complex apparatus, which is arranged, for example, on a single fighter plane in order to actively modify and reflect back an incoming radar signal in such a way that the fighter plane acts upon the radar like a different object—for example, a substantially larger passenger plane or bomber. Thus, different aircraft starting from a single flying object can be simulated with a radar system with a high degree of realism in order to enable a realistic assessment of weapon systems being deployed.

Two situations for the introduction of the protective method mentioned at the outset are conceivable. In the first situation, which is referred to as a "distraction," the missile has not yet locked onto the object to be protected, but rather is still in search mode to a certain degree, in which mode it is transmitting radar signals and awaiting radar reflections. If such a radar signal is received on an object to be protected, the direction, distance, and speed of the missile can be ascertained from said signal, and the decoy can be deployed directly together with the active offboard reflector, and an amplified reflected radar signal can be transmitted in the opposite direction of reception, so that the incoming radar-guided missile is as a result attentive to it and locks onto it. In the other situation of so-called "seduction," an already existing radar contact is assumed between the object to be protected or the decoy still located on the object and the incoming missile, and as a result the decoy is moved away from the object to be protected, while, by means of its active offboard reflector, the received radar signal of the missile is reflected back to the missile in amplified form.

A further development of the recognition measures or distinguishing measures for the attacking radar-guided missiles is also associated with increasing development of protection methods—in particular, of the type described above. Thus, radar-guided missiles equipped with intelligent devices for detecting and assessing reflected radar signals are able to distinguish between decoys and genuine targets with increasing quality. Such devices can, for example, provide an assessment between a genuine target and a radar reflection caused by a decoy on the basis of the spatial and temporal form of the radar echo. From the point of view of the object to be protected, there is therefore the risk that the decoy maneuver will be recognized as such and bypass measures will be effectively initiated.

SUMMARY

The object of the present invention is to effectively counteract this.

In a method of the type mentioned at the outset, this object is achieved according to the invention in that, in order to carry out the method, a plurality of flying drones are deployed, each having at least one active offboard reflector, and in that the drones are positioned relative to one another in space in such a way that their active offboard reflectors act as individual scattering centers, and their signals transmitted back to the missile collectively produce a radar scatter pattern that simulates the object to be protected.

It is therefore proposed according to the invention to emulate or simulate the object to be protected by a plurality of drones and thus by a plurality of active offboard reflectors as individual scattering centers.

As a result, even a three-dimensionally large object, such as a ship, can be reproduced realistically by the decoy. As a result of the plurality of individual scattering centers to be arranged in the air space corresponding to the object to be protected in the form of the active offboard reflectors carried along by the drones, the radar signature of the object to be protected, and in particular of a ship, can be imaged in a certain way and thus custom simulated to be as realistic as possible. Due to the number and arrangement of the drones and the active offboard reflectors they carry along relative to one another—in particular, with regard to the density of the arrangement, i.e., the number of drones per viewing surface or per spatial volume—the actual scattering centers of the object to be protected can be realistically simulated. In particular, it is conceivable that a higher drone density be formed as a decoy in regions spaced further apart from the surface of the water, e.g., to simulate a bridge house or other structures of a typical ship, in order to make it even more difficult for intelligent missiles to distinguish the decoy from the object to be protected.

According to the invention, the real radar signature of the object to be protected, and in particular of a ship or marine ship, is thus simulated by a plurality or even a multitude of individual active offboard reflectors, which are carried along in a swarm of drones. The flying drones are controlled here such that each drone preferably assumes a predetermined position within the swarm corresponding to a predefined or previously calculated pattern in such a way that the true scattering centers of the object are realistically presented from the perspective of the incoming missile.

This basic principle of the protective method proposed here can also be realized independently of any polarization direction of the radar signal transmitted by the incoming missile. For this purpose, it is expedient for the respective receiving antennas and also transmitting antennas to be aligned such that each polarization direction can be received, amplified, and returned to the missile in the opposite direction of reception.

As already mentioned, the protection method is initiated by detecting an incoming radar-guided missile. It proves to be advantageous that the direction of reception of the radar signal and thus a direction of approach of the radar-guided missile is ascertained by means of the receiving antennas and/or by means of an additional sensor. The knowledge of the exact direction of reception proves to be essential in order to transmit the received radar signal back to the missile in an amplified form precisely in the opposite direction of reception, i.e., to transmit an active radar response. The knowledge of the direction of approach of the radar-guided missile which can generally also be derived therefrom, but which can also be ascertained in another way, proves, however, to be advantageous in order to select, as a function of this direction of approach and in particular as a function of the orientation of the object to be protected and in particular its movement state—in particular, its direction of movement—a suitable, predetermined decoy pattern or to calculate it as a function of, in particular, further parameters. This decoy pattern then corresponds to an arrangement of the drones and the active offboard reflectors they carry along in space, viz., both with regard to the location of this drone swarm relative to the object to be protected and also: with regard to the arrangement of the drones in the swarm, i.e., the respective distances of adjacent drones from one another.

It is conceivable here in principle that the ascertainment of the direction of reception of the hostile radar signal and the ascertainment of the direction of approach at the beginning already be carried out using the active offboard reflectors on one or more drones, or this ascertainment be able to be carried out before or at the beginning of the protection method by suitable receiving devices, sensor devices, and computing devices on the object to be protected.

With regard to the design and outfitting of the drones, it proves to be advantageous that a direction of reception of a radar signal and/or a direction of approach of the radar-guided missile is ascertained by providing and using a plurality of receiving antennas in a drone—in particular, in the form of an array-like arrangement of receiving antennas—in particular in the form of a van-Atta-array of receiving antennas, and in particular by means of phase comparison of a radar wave received by several receiving antennas. It is regarded as advantageous if each drone of the drone swarm is designed in this way. However, it would also at least be conceivable that a direction of reception of the hostile radar signal and/or a direction of approach of the missile be ascertained only on a few drones as master drones and be transmitted by means of drone-to-drone communication to the other drones of the swarm. In any case, it proves to be advantageous if each drone is equipped by means of an electrical flight drive control, so that the drones themselves can be optimally positioned in such a way that their receiving antennas and transmitting antennas are optimally aligned to detect and re-transmit the radar signals from or to the incoming radar-guided missile, and in particular to detect even polarized radar signals.

It would in principle be conceivable that an object to be protected always be accompanied by a drone swarm already located in the air as a decoy. For example, several drone swarms could be kept available on the object to be protected and could be brought into the air in an alternating manner and recovered for supplying them with power. However, the drones, before they are deployed, should typically be arranged or carried along on the object to be protected or on an accompanying vehicle and, in this case, preferably only enter the air for the execution of the decoy maneuver starting from the object to be protected or starting from the accompanying vehicle carrying the drones.

Because the time periods between the detection of an incoming radar-guided missile and its reaching the target are sometimes extremely short and can be in the range of 10 to 20 seconds in the individual case, it proves to be advantageous that the drones are brought into the air by means of a throwing device for their flight deployment starting from the object to be protected or starting from an accompanying vehicle carrying the drones.

It proves to be advantageous here if the drones are brought into the air by means of an electronically controlled throwing device for their flight deployment, in such a way that the direction, speed, and/or distance of the transport relative to the object to be protected are ascertained taking into account and as a function of a previously ascertained direction of approach and preferably further parameters of the incoming radar-guided missile.

The throwing device can be a throwing device operating with an explosion drive, and in particular a mortar device, by means of which the drones are shot into the air at a predetermined speed and direction. Compressed air and/or rocket drives are also conceivable.

Furthermore, it proves to be advantageous that the drones are brought into the air by means of the electronically controlled throwing device according to a previously calculated decoy pattern. Using an electronically controlled throwing device set up thereon, the respective drones can already be brought to their approximate swarm position in space and relative to the object to be protected by means of the throwing device.

In order to optimize and stabilize the previously selected or calculated decoy pattern according to which the drones are to be arranged in the air, it proves to be advantageous that, for a respective drone, its current actual position is ascertained relative to its starting position on the object to be protected or on the accompanying vehicle and is compared to a reference position—in particular, a previously calculated reference position—and that, by means of an electronic flight drive control device, a respective flight drive mechanism of the drone is controlled in such a way that the drone assumes, in particular, the previously calculated reference position.

Each drone thus has its place within the drone swarm relative to the other drones which it has to assume according to a decoy pattern that is predetermined or ascertained after contact with the missile.

By means of the electronic flight drive control device which is provided with a reference position of the drone in question, a respective drone can be brought into its place within the drone swarm.

In particular if a receiving antenna or a receiving or transmitting antenna arrangement is not designed to be omnidirectional, but has a preferred direction, a control of the flight drive of the drone preferably takes place in such a way that there is an optimal alignment with the radar signal of the radar-guided missile.

For the position determination, it can prove advantageous that, for a respective drone, its current actual position is ascertained absolutely and/or relative to its starting position by means of GPS or preferably by means of an acceleration sensor system. The acceleration sensor system can have one or more acceleration sensors and/or rotation rate sensors; The acceleration sensor system can thus form an inertial measuring device, for example.

Furthermore, it can prove advantageous if a distance control is carried out between the drones, and the drones for this purpose in particular communicate, i.e., exchange bidirectional information. However, the latter is not absolutely necessary, but, rather, the distance between the drones can also be controlled, for example, by time measurement of electromagnetic signals. It would be conceivable, for example, for a particular drone to be aligned or oriented with respect to one or more adjacent drones, or an alignment or orientation with respect to a master drone would be conceivable.

It proves to be advantageous if the plurality of drones, i.e., the drone swarm, are themselves moved corresponding to previously predetermined or calculated swarm speeds. The respective absolute reference position of the drones or of the drone swarm is therefore also time-dependent. It proves to be advantageous here if the drones or the drone swarm are moved away from the object to be protected. However, this distancing movement should take place continuously, i.e., so as to avoid abrupt changes in direction, which in turn could be detected by an intelligent evaluation system as decoy movements.

The subject matter of the invention is also a protection system. According to the invention, it is proposed that the protection system mentioned at the outset comprise a plurality of drones which together form the decoy, wherein at least some and preferably all of the drones each have at least one active offboard reflector, that the drones have flight drive mechanisms and electronic programmable control devices interacting therewith which are configured to arrange the drones in three-dimensional space and relative to one another according to a predetermined or previously calculated decoy pattern corresponding to the object to be protected, so that the drones and their active offboard reflectors act as individual scattering centers and collectively produce a radar scatter pattern that simulates the object to be protected. In the sense of the present invention, it is intended that all drones preferably be designed in this way. However, it would also be conceivable that drones with only passively reflective reflectors be additionally carried along in the swarm. This can also have a positive effect on the simulation of a radar scattering pattern or the radar signature that simulates the object to be protected.

In order to quickly get the plurality of drones into the air to form a drone swarm, which simulates the decoy with its reflected radar signals, it proves to be advantageous if the protection system comprises an electronically controlled throwing device which can be aligned in azimuth and elevation and is set up in such a way that the plurality of drones can thus be brought into the air, and in particular can be shot into the air, for their flight deployment. This can take place in particular by ignition of a drive source—for example in the form of munitions. The throwing device can thus be designed in the form of a mortar or in the form of a rocket launcher. The term, "throwing device," is therefore to be understood in the broadest sense. The throwing device can in particular have a firing platform as a carrier of the drones to be made airborne, an elevation drive device, an azimuth drive device, a firing device in order to get the drones into the air by igniting a munition, a common base platform for accommodating the drives, and/or a damping device on the base platform for damping or reducing the effect of movements in the object to be protected.

Furthermore, it proves to be advantageous if a device for ascertaining data on the movement state of the object to be protected is provided for the protection system. These include, for example, the speed and the direction of the movement of the object to be protected, as well as the relative orientation to the direction of approach of an incoming hostile missile. This device and in particular also the aforementioned device for ascertaining missile data—in particular, for ascertaining the direction of reception of the received radar signal of the missile—are preferably provided at least also in the object to be protected and form a part of the protection system claimed here. This protection system can further comprise a computing unit and data storage unit, e.g., in the form of a central computer, where the so-called "ship data file" is also stored. Contents can be stored therein, which are read out in the event of defense or attack, and can comprise a concept applied to defense—in particular, in the form of a decoy pattern—which can be selected or also calculated, and can, for example, be passed on to the throwing device and possibly also to the flight drive control devices of the drones. However, it is also conceivable that decoy pattern data already be permanently programmed in for the drones and the flight drive control devices thereof. For example, the particular position of each drone within the swarm could already be permanently predefined.

Furthermore, it proves to be advantageous if, in turn, a device for selecting or calculating a decoy pattern is preferably provided on the object to be protected as a function of the ascertainment of missile data and/or of data about the movement state of the object to be protected, in particular, as a function of the ascertained type of the missile, as a function of a direction of approach of the missile, and/or as a function of the relative orientation of the object to be protected with respect to the direction of approach of the missile. In the simplest case, it would be conceivable for a decoy pattern corresponding to the true radar signature of the ship to be stored in a memory device of a computing unit of the object to be protected, which pattern corresponds to the relative positions of the several drones within the drone swarm, i.e., denotes a type of three-dimensional decoy structure. As soon as an approach of a hostile radar-guided missile is determined and a direction of approach of the missile has been ascertained, an optimal arrangement and alignment of the decoy pattern, i.e., of the drone swarm as a three-dimensional decoy structure, can be set relative to the object to be protected and the incoming missile, and can be implemented by suitable control of the throwing device for the drones. Once the drones are brought into the air, they are then arranged within the swarm with respect to at least the adjacent drones in the swarm.

As already mentioned, it proves to be advantageous that, at a drone, a device for ascertaining a direction of reception of a radar signal and/or a direction of approach of the radar-guided missile is provided—in particular, by a plurality of receiving antennas, in particular in the form of an array-like arrangement of receiving antennas, and in particular in the form of a van-Atta-array of receiving antennas. All drones are preferably designed in this way.

Furthermore, with regard to the implementation of the decoy pattern, it proves to be advantageous if, for a respective drone, a device for determining its current actual position—in particular, relative to its initial position—and for comparison with its reference position corresponding to the decoy pattern to be formed is provided.

As explained above, it proves to be advantageous if the device for determining the actual position is GPS-based or based upon an acceleration sensor system.

Furthermore, it proves to be advantageous if the drones have distance measuring devices in order to be able to ascertain an actual distance from at least one adjacently-flying drone, and that the flight drive control devices of the drones are designed to control the flight drive mechanism as a function of this actual distance in such a way that a predetermined target distance is reached.

Further features, details, and advantages of the invention will become apparent from the appended claims and the drawings and the following description of a preferred embodiment of the invention.

DETAILED DESCRIPTION

A method according to the invention for protecting an object from a radar-guided missile and a protection system according to the invention related thereto will be explained with reference to the figures.

Figure 1:
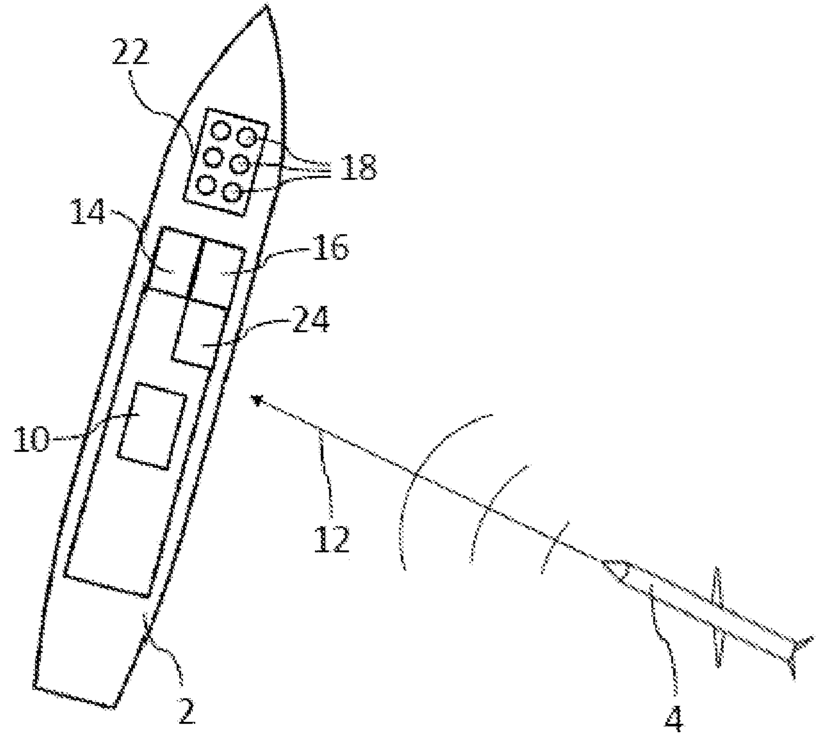
FIG. 1 is a schematic representation, not to scale, of a threat situation due to the approach of a radar-guided missile towards an object in the form of a ship.

FIG. 1 indicates a threat situation in which an object 2 to be protected in the form of a seagoing ship is located in the range of influence of an incoming radar-guided missile 4. The missile 4 transmits a radar signal in the form of a wide radar lobe in the approximate direction of the genuine target to be hit. It is designed to receive a radar signal reflected from a genuine target and to carry out a radar-guided target guidance to the source of the reflection and thus to arrive at the genuine target.

Figure 2:
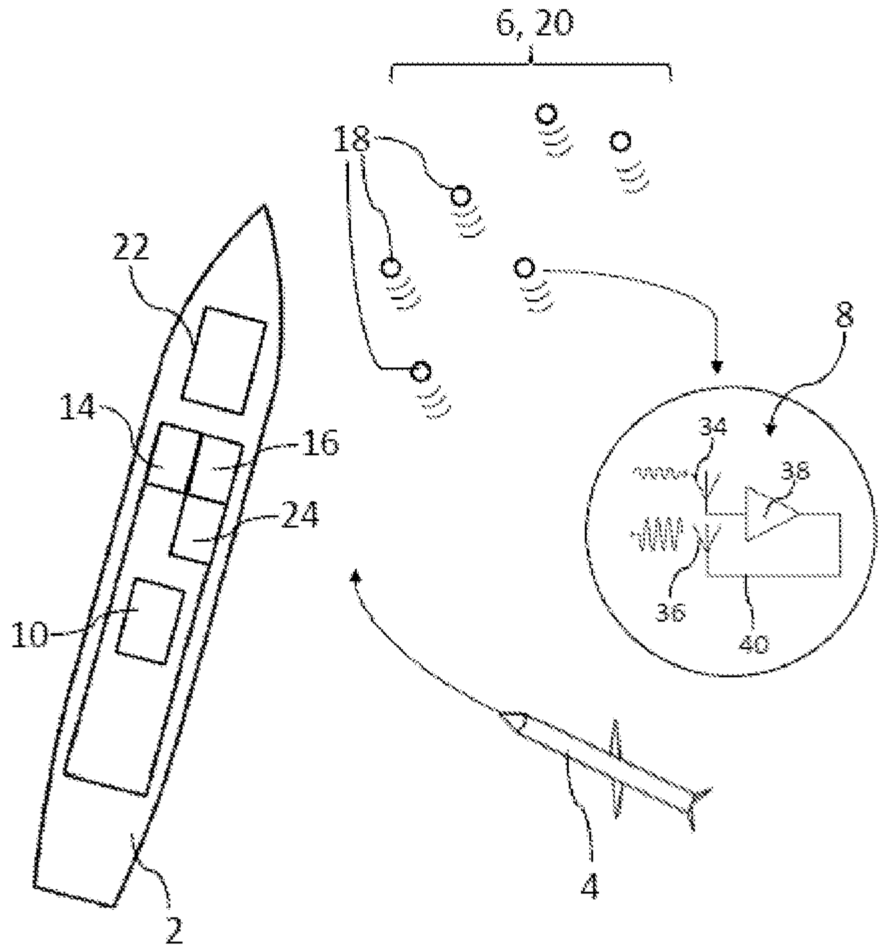
FIG. 2 is a schematic representation of the deployment of a decoy directly following a detection of the threat situation according to FIG. 1.

If this threat situation has been recognized as such on the object 2 to be protected, a decoy 6, which is still to be explained in more detail, can be deployed as indicated in FIG. 2, which decoy, by means of active offboard reflectors 8 provided on the decoy 6, can receive, amplify, and transmit back to the missile 4 the radar signal transmitted from the missile 4, so that the missile 4 does not lock onto the object 2 to be protected, but instead executes its homing control or guidance in the direction of the decoy 6.

In order to detect the threat situation, a device 10 for detecting an incoming missile and for ascertaining missile data—in particular, for ascertaining a direction of reception 12 of the radar signal transmitted by the missile 4—is provided on the object 2 to be protected. If the threat situation has been recognized as such and, preferably, sufficient missile data could also be ascertained, a defense or protection strategy suitable for this situation is selected and immediately implemented, with access to a central computer 14 of the object 2 and/or to a device or computing unit 16 of the protection system. The central computer 14 or this device 16 is designed to select or calculate a protection strategy and a decoy pattern and to implement them.

Figure 6:
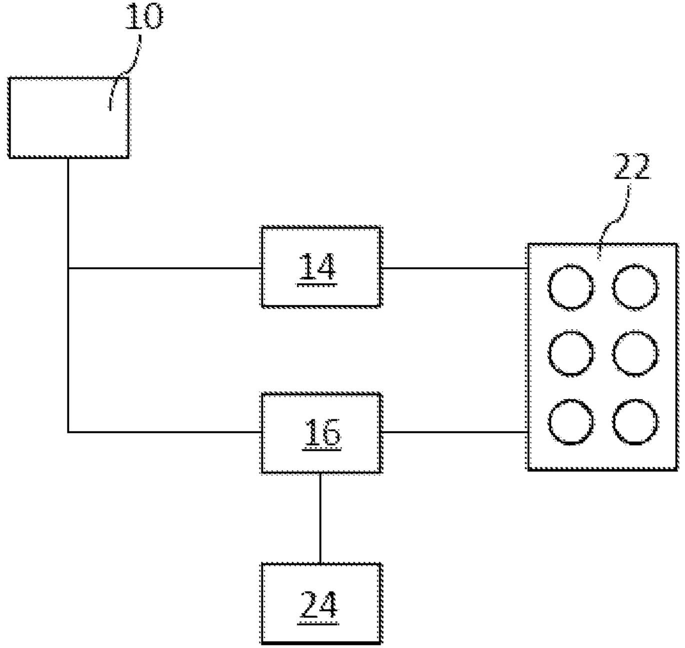
FIG. 6 is a schematic representation of components of a protection system on board the object to be protected.

For this purpose, a plurality of drones 18 are brought into the air according to the invention in such a way that the drones 18 are arranged relative to one another in accordance with a selected or calculated decoy pattern and are brought to a distance from the object 2 to be protected, so that they form a drone swarm 20 corresponding to the selected or predetermined decoy pattern, which pattern is schematically indicated in FIG. 2. For this purpose, the drones 18 can be launched on board the object 2 to be protected by means of a throwing device 22, which can be adjusted in azimuth and elevation, in order to form the drone swarm 20 as the distance from the object 2 to be protected increases. The throwing device 22 is preferably electronically controlled and receives its control commands preferably from the aforementioned computing unit 16 on the object 2 to be protected or the protection system. In this case, further parameters from a device 24 for ascertaining or providing data—in particular, on the movement state of the object 2 to be protected, on wind, or on seagoing conditions—can also be taken into account in the computing unit 16. This is indicated in FIG. 6. The throwing device 22 is controlled in such a way that the drones 18 reach the intended position in space and within the drone swarm 14 as quickly as possible to form the decoy 6.

In the present case, the term, drone 18, is understood to mean an unmanned, autonomously-flying aircraft, e.g., in the form of a missile with a helicopter drive, and in particular a hexacopter drive, i.e., with a flight drive mechanism 30 and with an electronic programmable control device 32 interacting therewith. The drones 18 and their flight drive mechanisms 30 and control devices 32 are configured and designed to arrange the drones 18 in three-dimensional space and relative to one another according to a decoy pattern that corresponds to the object 2 to be protected. The arrangement of the drones 18 within the drone swarm 20 thus forms the aforementioned decoy pattern, whereby the decoy 6 is formed.

Figure 5:
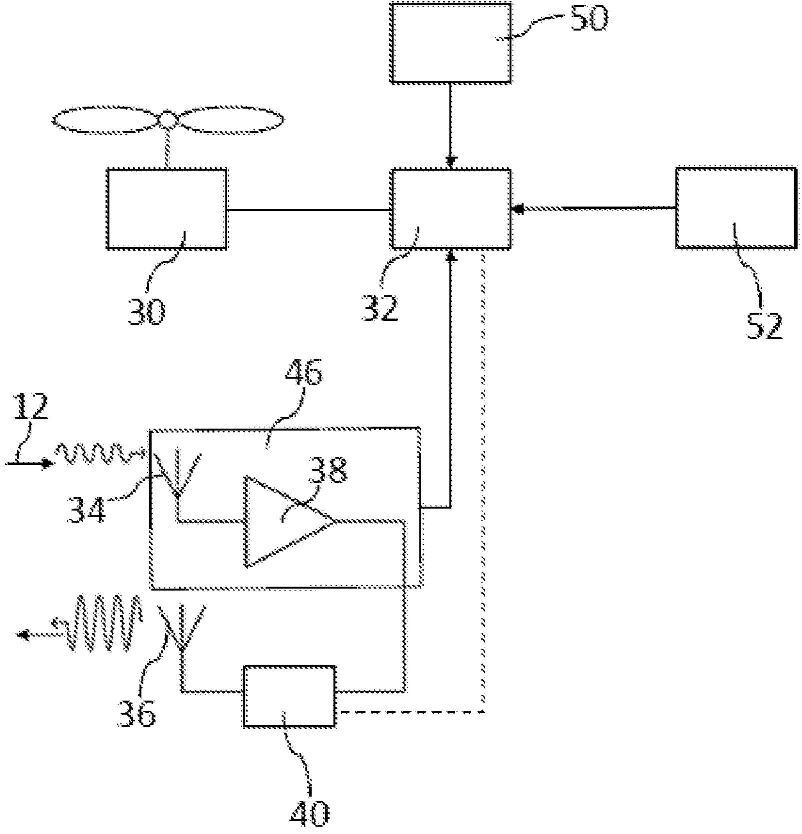
FIG. 5 is a schematic representation of an active offboard reflector and further components of a respective drone.

Each drone 18 preferably has an active offboard reflector 8, the components of which are indicated schematically in FIG. 2 and in FIG. 5. It comprises in each case at least one schematically indicated receiving antenna 34 and at least one transmitting antenna 36 and an intermediately connected device 38 for amplifying the received radar signal and a device 40 for controlling the transmitting antenna 36 for transmitting the amplified radar signal in the opposite direction of reception 12 back to the incoming missile 4.

Figure 3:
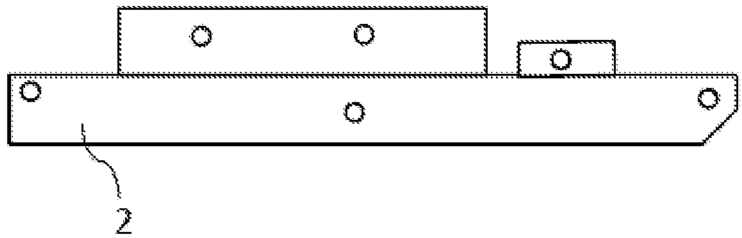
FIG. 3 shows the schematic indication of the positioning or arrangement of drones with active offboard reflectors as individual scattering centers for simulating the object to be protected, which is also shown.
Figure 4:
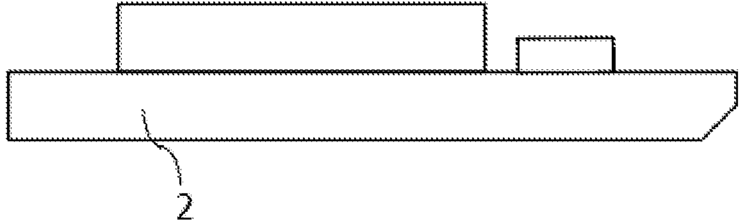
FIG. 4 shows the object to be protected and, at a spatial distance therefrom, the spatial arrangement of drones with active offboard reflectors in a drone swarm for forming a decoy.
Figure 4:
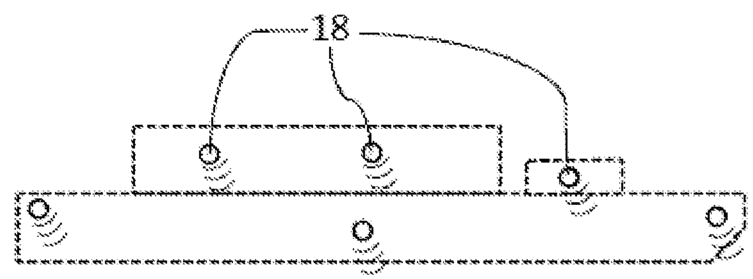

FIGS. 3 and 4 illustrate the selection of a suitable decoy pattern in the form of a decoy structure or decoy assembly of the drones 18 forming the decoy 6 in the form of their arrangement relative to one another within the drone swarm 20. FIG. 3 schematically shows an object 2 to be protected in the form of a ship. Each three-dimensionally emitting object does not have a single dispersion center, but, rather, its radar dispersion pattern, often also referred to as radar signature, will transmit a strong radar echo from different regions of the object, as a function of their suitability, in the opposite direction of reception. For example, areas of a ship which are further away from the surface of the water in sea travel, such as a bridge structure or the smokestack, contribute more strongly to the radar echo than regions located close to the water surface. Furthermore, obliquely-inclined planar regions also contribute to a lesser extent than ideally rectangular nested structures, which favor the reflection of incident radar radiation in the opposite direction of incidence. There is therefore the possibility of arranging a plurality of drones with their active offboard reflectors 8 according to the spatial projection and the assumed contribution of significant dispersion centers of the object 2 to be protected. Where a strong radar echo is naturally to be expected on the object to be protected, an actively reflective drone 18 is therefore arranged on the decoy 6 in the form of the drone swarm 14. For example, in regions of highest reflection contribution, such as the bridge region or smokestack, several drones can be arranged at a lesser distance from one another, i.e., in a higher drone density, according to the selected decoy pattern, than in regions close to the water at the bow or rear of the ship. FIGS. 3 and 4, meanwhile, are intended to illustrate only in a schematic manner the arrangement of drones 18 corresponding to the specific type of characteristic of the object 2 to be protected. In this way, according to the invention, a reflected radar signal, which is reflected back to the transmitting hostile missile 4, will have a large correspondence to an actually expected radar dispersion pattern of an intended genuine target—for example, in the form of a ship. The distinction between decoy and genuine target is thereby made more difficult according to the invention.

Finally, as already mentioned, FIG. 5 schematically illustrates the components of a respective drone 18. An arrangement of several receiving antennas 34 in an array form, and in particular in the form of a van-Atta-array of a drone 18, can form part of a device 46 for ascertaining the direction of reception 12 of the radar signal transmitted and received by the missile. This direction information is made available to the flight drive control device 32 of the drones 18, and control commands are provided to the flight drive mechanism 30 by means of the flight drive control device 32 in order to align the drone 18 and its active offboard reflector 8 or its transmitting antenna 36 for the best possible reception reflection and back reflection in the opposite direction of reception.

Furthermore, a respective drone 18 comprises a device 50 for ascertaining its current actual position. This device 50 schematically indicated in FIG. 5 can be GPS-based, or it can be designed, based upon an acceleration sensor system, with, in general, several acceleration and/or rotation rate sensors, with the latter being preferred. The flight drive control device 32 can then determine by the reference/actual comparison whether the drone 18 is located at its reference position within the drone swarm 20. If this is not the case, a storage control method can be executed by outputting corresponding control commands to the flight drive device 30.

Furthermore, a distance measuring device 52 is indicated in FIG. 5, by means of which distance information for adjacently-flying drones is preferably ascertained and can be given to the flight drive control device 32.

Overall, by means of the better simulation according to the invention of an object 2 to be protected with the decoy 6, it is possible via several active offboard reflectors 8 carried along in a drone swarm 20 to realize a more effective protection of the object 2 from an incoming radar-guided missile.

What is claimed is:

1. A method for protecting an object from a radar-guided missile, the method comprising:

detecting, on the object to be protected, an incoming radar-guided missile and ascertaining at least a direction of approach of the radar-guided missile;

deploying a plurality of flying drones from the object to be protected or from an accompanying vehicle carrying the drones by means of an electronically controlled throwing device, each drone having at least one active offboard reflector, the active offboard reflector comprising at least one receiving antenna, at least one transmitting antenna and an intermediately connected device for amplifying a received radar signal, wherein a direction, speed, and/or distance of the deployment relative to the object to be protected are determined as a function of the ascertained direction of approach of the incoming radar-guided missile, and wherein the drones are brought into the air by means of the electronically controlled throwing device according to a previously calculated decoy pattern;

for a respective drone, ascertaining its current actual position relative to its starting position on the object to be protected or on the accompanying vehicle, comparing the current actual position to a previously calculated reference position according to the decoy pattern, and controlling a flight drive mechanism of the drone by means of an electronic flight drive control device such that the drone assumes the previously calculated reference position; and at each drone, picking up a radar signal transmitted by the radar-guided missile via the at least one receiving antenna, amplifying the received radar signal, and transmitting the amplified radar signal via the at least one transmitting antenna in a direction opposite to a direction of reception of the radar signal back to the missile, wherein the drones are positioned relative to one another in space such that the active offboard reflectors thereof act as individual scattering centers, and the amplified signals returned to the missile collectively produce a radar scatter pattern that simulates the object to be protected.

2. The method according to claim 1, wherein the direction of approach of the radar-guided missile is ascertained by means of the receiving antennas and/or by means of an additional sensor on the object to be protected.

3. The method according to claim 1, wherein a direction of reception of the radar signal and/or the direction of approach of the radar-guided missile is ascertained by providing and using a plurality of receiving antennas at a drone arranged in the form of a van-Atta-array of receiving antennas, and by means of phase comparison of a radar wave received by the plurality of receiving antennas.

4. The method according to claim 1, wherein the drones, before their deployment, are arranged or carried along on the object to be protected or on an accompanying vehicle.

5. The method according to claim 1, wherein, for a respective drone, its current actual position is ascertained absolutely and/or relative to its starting position by means of GPS or by means of an acceleration sensor system.

6. The method according to claim 1, wherein a distance control is carried out between the drones, and wherein the drones for this purpose communicate by exchanging bidirectional information.

7. The method according to claim 1, wherein the plurality of drones are moved according to a previously predetermined or calculated swarm speed.

8. A protection system for carrying out the method according to claim 1, the protection system comprising:

a device arranged on the object to be protected for detecting an incoming radar-guided missile and for ascertaining missile data, the device including a direction of approach of the radar-guided missile;

a plurality of drones which collectively form a decoy, wherein at least some of the drones each have at least one active offboard reflector, the active offboard reflector having at least one receiving antenna and at least one transmitting antenna, as well as a device for amplifying a radar signal transmitted by the radar-guided missile and received by the receiving antenna, and a device for controlling the transmitting antenna for transmitting the amplified radar signal in a direction opposite to a direction of reception back to the incoming missile, wherein the drones have flight drive devices mechanisms and electronic programmable control devices interacting therewith, the electronic programmable control devices configured to arrange the drones in three-dimensional space and relative to one another according to a predetermined or previously calculated decoy pattern corresponding to the object to be protected, so that the drones and their active offboard reflectors act as individual scattering centers and collectively produce a radar scatter pattern that simulates the object to be protected; and an electronically controlled throwing device which is alignable in azimuth and elevation, by means of which the plurality of drones are brought into the air for their flight deployment, wherein, for a respective drone, a device for determining its current actual position relative to its initial position and for comparison with its reference position according to the decoy pattern to be formed is provided.

9. The protection system according to claim 8, wherein a device is provided for ascertaining data about the movement state of the object to be protected.

10. The protection system according to claim 8, wherein a device for selecting or calculating a decoy pattern is provided as a function of the ascertainment of missile data and/or data about the movement state of the object to be protected, including as a function of the ascertained type of the missile, as a function of a direction of approach of the missile, and/or as a function of a relative orientation of the object to be protected with respect to the direction of approach of the missile.

11. The protection system according to claim 8, wherein a device is provided at a drone for ascertaining a direction of reception of a radar signal and/or a direction of approach of the radar-guided missile by means of a plurality of receiving antennas arranged in the form of a van-Atta-array of receiving antennas.

12. The protection system according to claim 8, wherein the device for determining the actual position is GPS-based or designed based upon an acceleration sensor system.

13. The protection system according to claim 8, wherein the drones have distance measuring devices in order to be able to ascertain an actual distance from at least one adjacently-flying drone, and in that the flight drive control devices of the drones are designed to control the flight drive device as a function of this actual distance in such a way that a predetermined target distance is achieved.

* * * * *